United States Patent
Xu (10) Patent No.: US 12,407,774 B2
(45) Date of Patent: Sep. 2, 2025

(54) CALL TEST SYSTEM AND METHOD THEREOF

(71) Applicant: SAMSUNG ELECTRONICS CO., LTD., Suwon-si (KR)

(72) Inventor: Hui Xu, Suzhou Industrial Park (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 519 days.

(21) Appl. No.: 17/895,721

(22) Filed: Aug. 25, 2022

(65) Prior Publication Data
US 2023/0412728 A1 Dec. 21, 2023

(30) Foreign Application Priority Data
May 27, 2022 (CN) .......................... 202210593594.6

(51) Int. Cl.
H04M 3/26 (2006.01)
H04W 24/08 (2009.01)

(52) U.S. Cl.
CPC ............ H04M 3/26 (2013.01); H04W 24/08 (2013.01)

(58) Field of Classification Search
CPC ............ H04M 3/26; H04M 3/22; H04M 1/24; H04W 24/08
See application file for complete search history.

(56) References Cited

U.S. PATENT DOCUMENTS

| | | | |
|---|---|---|---|
| 7,197,010 B1 * | 3/2007 | Berstein | H04L 43/00 370/252 |
| 7,843,991 B2 | 11/2010 | Fok et al. | |
| 8,918,197 B2 | 12/2014 | Suhami | |
| 10,121,488 B1 | 11/2018 | Drews et al. | |
| 10,404,853 B2 | 9/2019 | Smith | |
| 10,504,504 B1 | 12/2019 | Meltzner et al. | |
| 10,748,554 B2 | 8/2020 | Huang et al. | |
| 10,965,414 B2 * | 3/2021 | Zhong | H04L 5/0048 |
| 11,252,522 B2 | 2/2022 | Disatnik et al. | |
| 11,800,445 B2 * | 10/2023 | Chu | H04W 52/0216 |

(Continued)

FOREIGN PATENT DOCUMENTS

| | | |
|---|---|---|
| CN | 101262686 A | 9/2008 |
| CN | 101287263 A | 10/2008 |

(Continued)

OTHER PUBLICATIONS

Luo Fei, CN114050962A, Feb. 15, 2022, English Translation of Description.*

(Continued)

Primary Examiner — Lisa Hashem
(74) Attorney, Agent, or Firm — Sughrue Mion, PLLC (57) ABSTRACT

A call test system sets up a call between a calling terminal and a called terminal. The call test system generates an original signal in a first format and converts it to a second format which can be stored in a memory of the calling terminal. The calling terminal sends the signal in the second format over the channel to the called terminal. The called terminal stores the received signal in the second format and sends it to the call test system. The call test system converts the received signal in the second format to the first format and compares it with the original signal in the first format. The comparison may be in the time domain and/or the frequency domain.

20 Claims, 4 Drawing Sheets

(56) References Cited

U.S. PATENT DOCUMENTS

| | | | |
|---|---|---|---|
| 11,956,139 B2* | 4/2024 | Delbue | H04L 69/18 |
| 12,021,770 B2 | 6/2024 | Fei et al. | |
| 2002/0141392 A1* | 10/2002 | Tezuka | H04L 47/10 |
| | | | 370/352 |
| 2002/0145979 A1* | 10/2002 | Baj | H04L 65/80 |
| | | | 370/242 |
| 2002/0167937 A1* | 11/2002 | Goodman | H04L 12/6418 |
| | | | 370/352 |
| 2025/0112899 A1* | 4/2025 | Albero | G06N 5/022 |

FOREIGN PATENT DOCUMENTS

| | | | |
|---|---|---|---|
| CN | 107274912 A | | 10/2017 |
| CN | 112335218 A | | 2/2021 |
| CN | 113746614 A | | 12/2021 |
| CN | 114050962 A | * | 2/2022 |
| KR | 10-2002-0012642 A | | 2/2002 |

OTHER PUBLICATIONS

Communication issued on Nov. 30, 2024 from the China National Intellectual Property Administration for Chinese Patent Application No. 202210593594.6.

* cited by examiner

CALL TEST SYSTEM AND METHOD THEREOF

CROSS-REFERENCE TO RELATED APPLICATION(S)

This application claims benefit of priority to Chinese Patent Application No. 202210593594.6, filed on May 27, 2022, in the Chinese Patent Office, the disclosure of which is incorporated by reference herein in its entirety.

TECHNICAL FIELD

The application belongs to the field of wireless communication, and more specifically, involves an automatic call test system and an automatic call test method.

BACKGROUND

In the field of mobile communications in recent years, the product update iteration speed of various mobile phone terminal manufacturers has been accelerated, and the development cycle of new products has been shortened repeatedly. However, in order to ensure product quality, testing cannot be omitted or reduced at any stage of product development. In order to improve test efficiency, all manufacturers are willing to convert some of the tests that are highly repeatable, uncomplicated, and time-consuming from manual testing to automated testing. Voice call is the most basic test item with the highest stability requirements in the communication chip test and terminal test.

Call scenarios are divided into indoor, outdoor, static and dynamic, short call and long duration call, the same and different network standards, call waiting and call forward and other various complex scenes. Changing the voice call test from manual test to automated test will greatly reduce test operation costs, reduce the number of test participants, extend test duration, and improve test efficiency. The voice call test not only needs to check call connection rate, dropped calls, etc., but also check whether the content of the voice call can be received clearly and completely by the other party.

In the related art, the terminal voice call automation test generally adopts the following two methods: using dual-tone multi-frequency (DTMF) code as voice source, or using voice recognition (VR) technology for voice call testing.

When the DTMF code is used as the content of the call to test, after the voice call is connected, the dial keyboard on the mobile phone is pressed, and every time a key is pressed, a DTMF signal is sent to the other mobile phone, the receiving side could judge the voice call situation by detecting specific DTMF signals, so the DTMF code can be used as the source signal for the call voice packet detection.

However, the method of checking the content of the call by using the DTMF code can only be used for more mature terminal product testing, not suitable for communication chip testing or terminal development phase testing, because the DTMF code of the terminal during the development phase may also have problems. The sending of the DTMF code by the terminal cannot be guaranteed, so the subsequent test judgment will cause serious errors.

When the voice recognition technology is used to detect the content of the call, a player is used to play the real voice signal to the mobile phone at the receiving side to simulate a real human test environment, and then the voice recognition is performed on the voice signal received by the receiving side to judge the voice call situation.

However, the method of detecting the content of the call by using the voice recognition method is not only too large but also susceptible to noise interference. In the voice call test of the terminal, the general call content is not complicated. Manual tests often use relatively fixed test languages such as "Hello, 1234567, 7654321 . . . ". If a special test language is made for this purpose, the voice recognition module is not only expensive to maintain due to excessive code size, but also unnecessary. In addition, considering that the test environment may be noisy, the risk of human voice signals being submerged by environmental noise is extremely high, and the recognition is difficult.

SUMMARY

Provided herein is a system including: a signal generating module configured to generate a first calling signal in a first format; a testing module configured to: transmit a second calling signal in a second format converted from the first calling signal to a calling terminal, drive the calling terminal to transmit the second calling signal to a called terminal as a call event, receive a third called signal in the second format corresponding to the second calling signal from the called terminal, and convert the third called signal into a resultant called signal in the first format; and a signal processing module configured to compare the first calling signal with the resultant called signal to determine a call status between the calling terminal and the called terminal.

Also provided herein is a method, including: generating a first calling signal in a first format; transmitting a second calling signal in a second format converted from the first calling signal to a calling terminal; driving the calling terminal to transmit the second calling signal to a called terminal as a call event; receiving a third called signal in the second format corresponding to the second calling signal from the called terminal; converting the third called signal into a resultant called signal in the first format; and comparing the first calling signal with the resultant called signal to determine a call status between the calling terminal and the called terminal.

According to an exemplary embodiment, there is provided a computer-readable storage medium having stored computer program instructions thereon, the computer program instructions, when executed by a processor, causing the processor to implement the provided method.

According to an exemplary embodiment, there is provided a system comprising at least one computing device and at least one storage device storing instructions, wherein the instructions, when executed by the at least one computing device, cause the at least one computing device to perform the provided method.

In the example embodiment, a small automatic call test system with good stability, light weight, rapid deployment, strong anti-interference ability and low maintenance cost is provided, by using a set of signals with fixed and obvious characteristics generated by the call test system, connecting, through wired communication, test terminals with a device installed with the call test system, and running the test call test system to perform signal processing, feature extraction, classification and recognition, etc. on the signal, so as to determine the call status.

DETAILED DESCRIPTION

In order to enable those ordinary skilled in the art to better understand technical solutions of the disclosure, the technical solutions in embodiments will be clearly, completely described below in conjunction with accompanying drawings.

Figure 1:
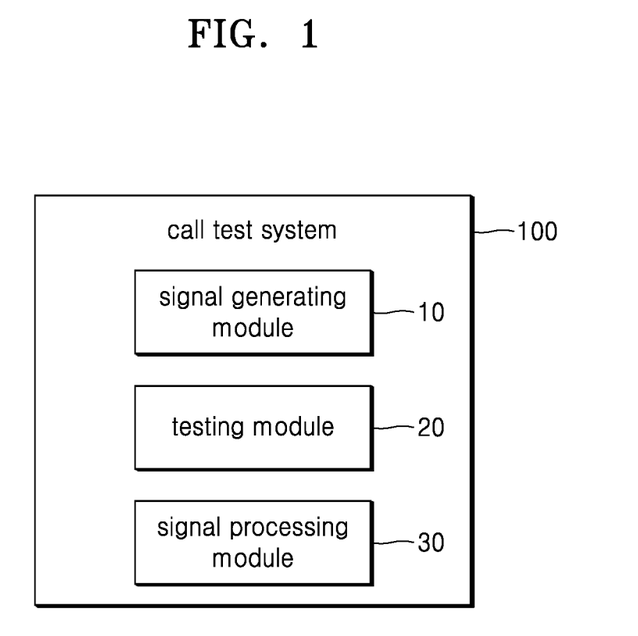
FIG. 1 is a schematic block diagram illustrating a voice call test system 100 according to an exemplary embodiment.

FIG. 1 is a schematic block diagram illustrating a call test system 100 according to an exemplary embodiment. The call test system 100 may be installed in various computing devices, intelligent devices or servers, etc., and the various devices installed with the call test system 100 may be connected, through wired communication (e.g., USB connection), with test terminals having a voice call function (a calling terminal and a called terminal, such as smart phone or smart watch, etc.) for automatic voice call test.

According to an exemplary embodiment, the call test system 100 may include a signal generating module 10, a testing module 20, and a signal processing module 30.

The signal generating module 10 may generate a calling signal in a first format (also may be referred to as a first calling signal). Here, the calling signal in the first format may be an analog voice signal with fixed and obvious characteristics. Specifically, the signal generating module 10 may generate the calling signal in the first format, by selecting one frequency from each of a predetermined number of different frequency ranges as a fundamental frequency, generating the predetermined number of signals corresponding to the selected fundamental frequencies respectively, and superimposing the predetermined number of signals. The process of generating the calling signal in the first format will be described in detail below with reference to FIG. 2.

Figure 2:
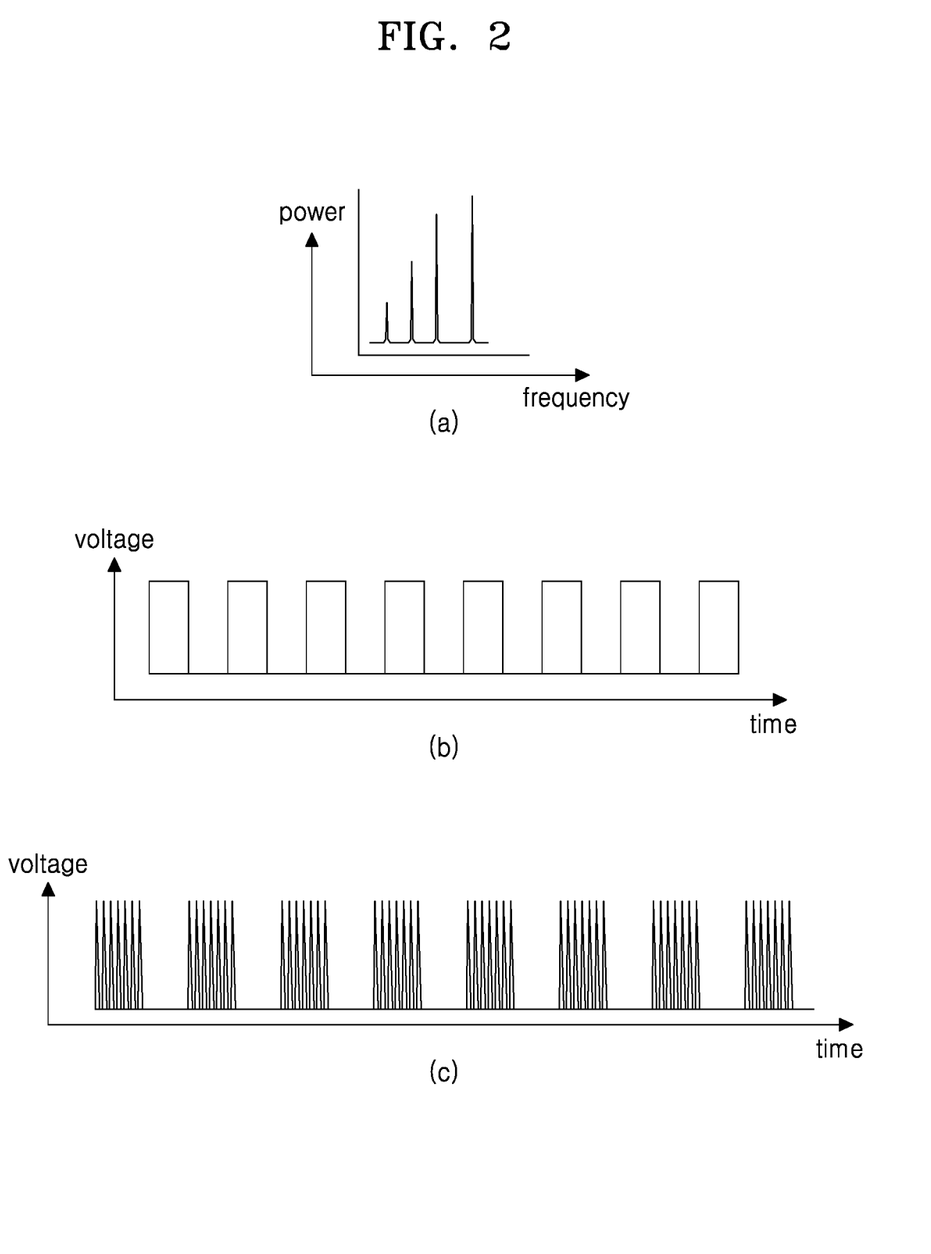
FIG. 2 is a diagram illustrating a calling signal in a first format according to an exemplary embodiment.

FIG. 2 is a diagram illustrating the calling signal in the first format according to an exemplary embodiment.

As an example, in order to imitate a real human voice frequency spectrum, a frequency spectrum of the calling signal in the first format may be simplified to a line-spectrum with only four typical frequencies in the frequency domain, but not limited thereto, for example, it may also be simplified to a line-spectrum with three, five or six typical frequencies in the frequency domain. Therefore, the complexity of the calling signal in the first format may be reduced in the case that the frequency components of the line-spectrum of the calling signal in the first format (i.e., sound source signal) are as much as possible to ensure the degree of human voice simulation, so as to provide a basis for subsequent anti-interference, signal processing, feature extraction and recognition.

As an example, first, a frequency may be selected arbitrarily from among each of four frequency ranges 100 Hz~500 Hz, 500 Hz~1 KHz, 1 K~1.5 KHz and 1.5 KHz~2 KHz divided according to the frequency range of human vocal cord vocalization and human hearing domain, as the fundamental frequency. For example, 200 Hz, 600 Hz, 1.1 kHz and 1.6 kHz may be selected as fundamental frequencies, and four signals respectively corresponding to the selected fundamental frequencies 200 Hz, 600 Hz, 1.1 kHz and 1.6 kHz may be superimposed into one signal, wherein a signal corresponding to a selected fundamental frequency is a fundamental signal with a single frequency spectrum, for example, cosine or sinusoidal signal. Accordingly, the frequency domain line-spectrum of the superimposed signal is shown in (a) of FIG. 2. At the same time, the time-domain sine wave of the superimposed signal may be shaped to form a periodic rectangular wave (as shown in (b) of FIG. 2), so as to increase the characteristics of the sound source signal, which is more conducive to the abnormality judgment of the call test system 100. The width and period of the periodic rectangular wave may be set, for example, the width of the periodic rectangular wave may be set to 2 seconds, and its period may be set to 3 seconds, but not limited thereto. In addition, in order to simulate loudness of real human voices, the loudness of the superimposed signal may be set to a fixed value within a specific range, for example, a fixed value in the range of 75 db±5 dB. So far, as shown in (c) of FIG. 2, a signal with fixed and obvious characteristics (i.e., the calling signal in the first format) has been generated, and in the call test system 100, the calling signal in the first format is used as a sound source signal simulating the call sound.

In addition, when only one calling signal in the first format is generated for call test, if a peculiar noise (the frequency of the noise is the same to that of the calling signal in the first format) appears in the network environment, the noise may drown the calling signal in the first format, resulting in inaccurate test. In order to solve such a problem and enhance the robustness and anti-interference ability of the call test system 100, the signal generating module 10 may generate a plurality of calling signals in the first format, and the plurality of calling signals in the first format may be used to test the call status between multiple pairs of calling terminals and called terminals, or the plurality of calling signals in the first format may be used to test one pair of calling terminal and called terminal in sequence. That is, the signal generating module 10 may generate a plurality of different calling signals in the first format in a similar manner, and each of the plurality of calling signals in the first format has a different frequency domain line-spectrum and the same time domain envelope. The signal generating module 10 may allocate different signal identifiers to the plurality of calling signals in the first format, for example, the plurality of calling signals in the first format may be numbered (e.g., 1, 2, 3 . . . ), or the plurality of calling signals in the first format may be distinguished from each other by any other suitable identification method. The signal generating module 10 may select one calling signal in the first format from among the plurality of calling signals in the first format, as the calling signal in the first format allocated to the calling terminal. When performing call test on multiple pairs of calling terminals and called terminals simultaneously, the signal generating module 10 may select and transmit a calling signal in the first format with respect to each calling terminal, and the calling signals in the first format transmitted to these calling terminals may be different from each other or may be the same.

In addition, the signal identifier of the calling signal may be transmitted to the calling terminal together with the calling signal as one data packet, or the signal identifier of the calling signal may be transmitted separately from the calling signal.

Alternatively, when it is determined that there is an abnormal noise in the call between the calling terminal and the called terminal by performing the call test on the calling terminal and the called terminal using one calling signal in the first format, the call test system 100 may further use another calling signal in the first format among the plurality of calling signals in the first format to test the call between the calling terminal and the called terminal again.

According to the exemplary embodiment, the testing module 20 may transmit a calling signal in a second format (also may be referred to as a second calling signal) converted from the calling signal in the first format to the calling terminal, drive the calling terminal to transmit the calling signal in the second format to the called terminal as a call event, receive a called signal in the second format (also may be referred to as a third called signal) corresponding to the calling signal in the second format from the called terminal, and convert the called signal in the second format into a called signal in the first format(also may be referred to as a resultant called signal).

Here, the calling signal in the second format may be transmitted to the calling terminal through wired communication (for example, a first wired communication link) and stored in a memory of the calling terminal. When the testing module 20 drives the calling terminal to transmit the calling signal in the second format to the called terminal, the calling signal in the second format may be read from the memory of the calling terminal and transmitted via the wireless network, and when the called signal in the second format corresponding to the calling signal in the second format is received by the called terminal via the wireless network, the called signal in the second format may be transmitted to the testing module 20 through wired communication(for example, a second wired communication link, which may be same as or different from the first wired communication link).

In addition, when transmitting the calling signal in the second format to the calling terminal, the testing module 20 may transmit the signal identifier of the calling signal to the calling terminal and the called terminal, to notify the calling terminal and the called terminal to set up a call, and when receiving the called signal in the second format, the testing module 20 may receive the signal identifier from the called terminal. That is, the signal identifier may not only be used to determine the calling signal in the first format allocated to the calling terminal from among the plurality of calling signals in the first format, but also be used as a control signaling to notify the calling terminal and the called terminal to set up the call, thereby improving the signaling transmission efficiency. The above signal transmission process will be described in detail later with reference to FIG. 3.

In an exemplary embodiment, the testing module 20 may include a first format converting unit and a second format converting unit (not shown). The first format converting unit may convert the calling signal in the first format into the calling signal in the second format, and the second format converting unit may convert the called signal in the second format into the called signal in the first format.

Figure 3:
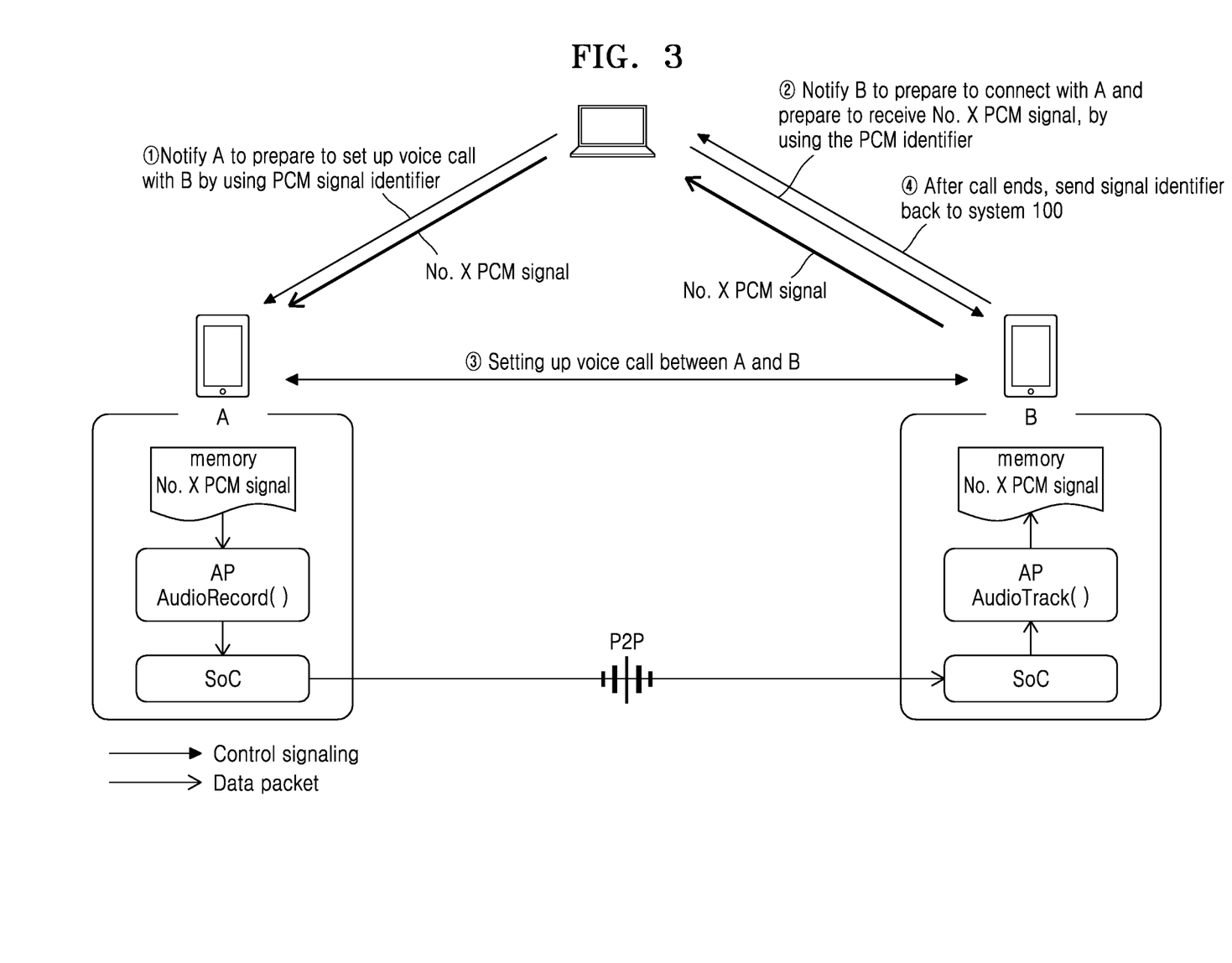
FIG. 3 illustrates an exemplary process of signal transmission between the system 100, a calling terminal A and a called terminal B according to an exemplary embodiment.

FIG. 3 illustrates an exemplary process of signal transmission between the call test system 100, the calling terminal A and the called terminal B according to an exemplary embodiment.

According to an exemplary embodiment, the first format described above may be an analog signal format, and the second format described above may be a digital signal format, for example, a pulse code modulation (PCM) signal format or other type of signal format generated by sampling, quantizing and/or coding the analog signal. As an example only, a detailed description will be given below using the PCM signal format.

When the calling terminal A and the called terminal B are connected, through wired communication (e.g., USB, HDMI or typeC, etc.), with a device installed with the call test system 100, the call test system 100 may start the call test of the calling terminal A and the called terminal B. The call test system 100 may select one calling signal in the first format from among the generated plurality of calling signals in the first format, convert it into a PCM signal (for example, by the first format converting unit), and transmit the PCM signal to the calling terminal A. The calling terminal A may store the received PCM signal in the memory (e.g., a disk) of the calling terminal A.

The call test system 100 may notify the calling terminal A and the called terminal B to set up a call connection using control signaling. The exchange of information over the call connection may be referred to as a "call" or as a "call event." For example, the call test system 100 may notify the calling terminal A and the called terminal B to set up a call connection using the signal identifier of the PCM signal (e.g., numbered as X, represented as No. X in FIG. 3). Then, the calling terminal A calls the AP interface (e.g., AudioRecord ( ), voice acquisition interface) through the APK (application package) to load the PCM signal and transmits the PCM signal to the communication module of the calling terminal A (e.g., the communication module is implemented on SoC, and the communication module includes a modem), the PCM signal, after being processed by the communication module, is transmitted to the called terminal B through a mobile network (e.g., cellular network or WiFi, etc., such as via point-to-point (P2P) communication).

The called terminal B may receive a signal from the calling terminal A from the network through its communication module and decode the signal into the PCM signal, and the AP interface of the called terminal B may obtain the PCM signal and store it in a memory of the called terminal B. After the end of the call, the called terminal B may transmit the PCM signal and signal identifier thereof back to the call test system 100, and the call test system 100 may convert the received PCM signal into the called signal in the first format for analysis and processing. Overall, the expressions "first calling signal," "second calling signal," "third called signal" and "resultant called signal" may be used herein to describe different portions of waveforms or data which are created, pass through the channel during the call event, and are converted for comparison. "Calling" refers to a signal before passage through the channel and "called" refers to a signal after passage through the channel. In an example embodiment, the calling signal in the first format may be referred to as the first calling signal. The signal No. X from test system 100 to terminal A is an example of the second calling signal. The signal No. X from terminal B to test system 100 is an example of the third called signal. The called signal in the first format used for comparison to determine quality and detect noise may also be referred to as the resultant called signal. In general, the first format is a high-accuracy representation of an analog waveform. In general, the second format is a digital encoding which may be passed over a wireline link without error. Examples of analog waveforms are shown in FIG. 2.

According to an exemplary embodiment, the signal processing module 30 may compare the calling signal in the first format with the called signal in the first format to determine a call status between the calling terminal and the called terminal. Specifically, the signal processing module 30 may determine the calling signal in the first format allocated to the calling terminal among the generated plurality of calling signals in the first format, based on the received signal identifier, and compare the determined calling signal in the first format with the called signal in the first format from the called terminal. The comparison may be performed by processing the analog waveforms of the calling signal in the first format and the resultant called signal with an analog-to-digital converter (ADC) followed by a digital signal processor (DSP). Alternatively, the calling signal in the first format and the resultant called signal, in some embodiments, are compared in the analog domain using analog circuitry such as an operational amplifier in a summer configuration. The output of analog circuitry may be processed with an ADC and DSP, for example.

The signal processing module 30 may include a feature extracting unit and an analyzing unit (not shown). The feature extracting unit may extract features of the calling signal in the first format and the called signal in the first format, and the analyzing unit may compare the features of the calling signal in the first format and the called signal in the first format, and determine the call status between the calling terminal and the called terminal based on the comparison result.

The extracted features may include at least one of a time domain envelope and a frequency domain line-spectrum. Since the voice analog signal is shaped when the signal is generated, and the features of the signal are fixed (one feature is that frequency points of the frequency domain line-spectrum is fixed; the other feature is that the time domain envelope is a periodic rectangular wave, referring to (a) and (b) of FIG. 2), various results (for example, noise, abnormal noise and normal call) of the voice call test may be completely judged by selecting the time domain envelope and frequency domain line-spectrum of the signal as the features.

For example, the analyzing unit of the signal processing module 30 may determine whether there are silent and intermittent abnormalities in the call between the calling terminal A and the called terminal B by comparing the time domain envelopes of the calling signal in the first format and the called signal in the first format. In addition, the analyzing unit may determine whether there is noise in the call between the calling terminal A and the called terminal B by comparing the frequency domain line-spectrums of the calling signal in the first format and the called signal in the first format.

As an example, the extracted features may be classified and recognized by using a threshold method. For example, in the time domain waveform of the called signal in the first format, the amplitudes A of the adjacent two points (e.g., K point and (K+1) point) on the time axis is taken. If $|A_{(K+1)} - A_{(K)}| \geq$ a predetermined threshold, it may be determined that there is a jump between the two points. The jump of rectangular wave may be observed in the time domain envelope and the jump of the line-spectrum may be observed in the frequency domain. Classification and recognition may be realized by comparing a K value (e.g., $A_{(K)}$) extracted by the threshold method with the corresponding feature of the original signal (the calling signal in the first format, which is determined based on the corresponding signal identifier and generated by the signal generating module 10) in the time domain and comparing a K value extracted by the threshold method with the corresponding feature of the original signal in the frequency domain.

Figure 4:
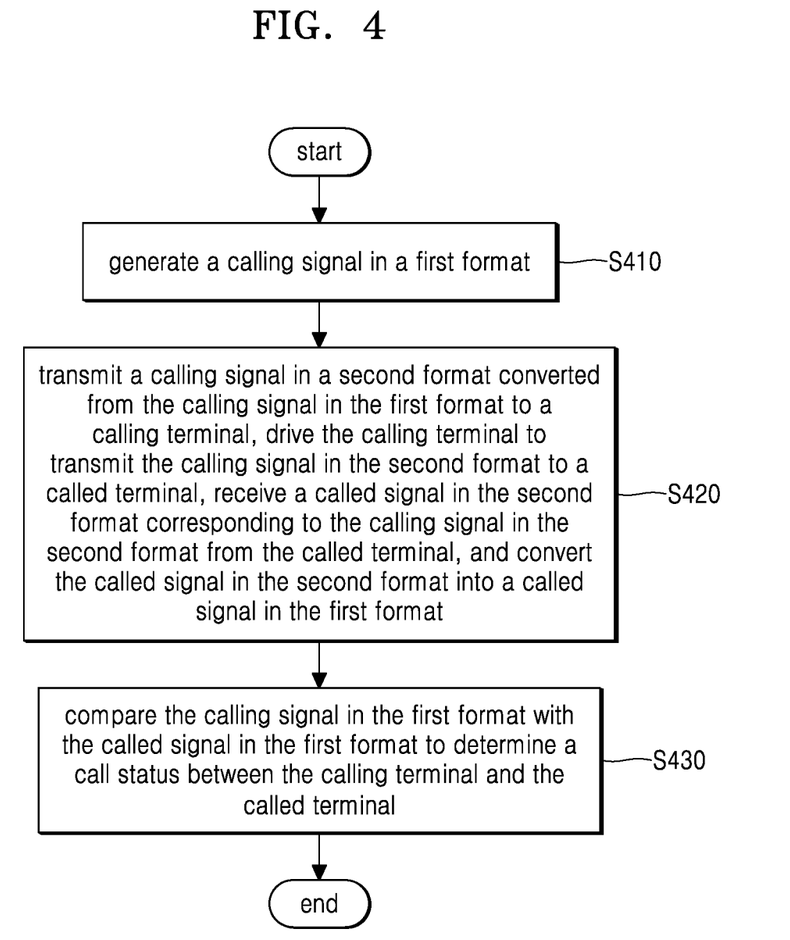
FIG. 4 is a flowchart illustrating a voice call test method according to an exemplary embodiment.

FIG. 4 is a flowchart illustrating a call test method according to an exemplary embodiment.

At operation S410, the call test system 100 may generate a calling signal in a first format. The calling signal in the first format may be generated by selecting one frequency from each of a predetermined number of different frequency ranges as a fundamental frequency, generating the predetermined number of signals corresponding to the selected fundamental frequencies respectively, and superimposing the predetermined number of signals. In addition, the call test system 100 may also generate a plurality of calling signals in the first format, may allocate different signal identifiers to the plurality of calling signals in the first format, and may select one calling signal in the first format from among the plurality of calling signals in the first format as the calling signal in the first format allocated to the calling terminal, wherein the plurality of calling signals in the first format may have different frequency domain line-spectrums and the same time domain envelope.

At operation S420, the call test system 100 may transmit the calling signal in a second format converted from the calling signal in the first format to a calling terminal, drive the calling terminal to transmit the calling signal in the second format to a called terminal, and receive a called signal in the second format corresponding to the calling signal in the second format from the called terminal, and convert the called signal in the second format into a called signal in the first format. Here, the calling signal in the second format is transmitted to the calling terminal through wired communication and stored in a memory of the calling terminal, when the testing module 20 drives the calling terminal to transmit the calling signal in the second format to the called terminal, the calling signal in the second format is read from a memory of the calling terminal and transmitted through the wireless network, and when the called signal in the second format corresponding to the calling signal in the second format is received by the called terminal through the wireless network, the called signal in the second format is transmitted to the call test system 100 through wired communication.

At operation 430, the call test system 100 may compare the calling signal in the first format with the called signal in the first format to determine a call status between the calling terminal and the called terminal. The call test system 100 may extract features of the calling signal in the first format and the called signal in the first format, and the extracted features may include at least one of a time domain envelope and a frequency domain line-spectrum. The call test system 100 may determine whether there are silent and intermittent abnormalities in the call between the calling terminal and the called terminal by comparing the time domain envelopes of the calling signal in the first format and the called signal in the first format, and may determine whether there is noise in the call between the calling terminal and the called terminal by comparing the frequency domain line-spectrums of the calling signal in the first format and the called signal in the first format.

At the same time, other calling signals in the first format except for the calling signal in the first format allocated to the calling terminal, among the plurality of calling signals in the first format, may be used to determine the call status between other terminals.

In addition, in order to ensure the voice signal playback time matches the call establishment time, the automated call test system 100 needs to arrange a timing of each test step and set a status value transfer mechanism. After each terminal receives an action instruction, it executes the instruction, and feeds back an execution result to the call test system 100 after execution, to ensure that the execution of each action is performed in accordance with the timing arrangement.

In the exemplary embodiment, a small automatic call test system with good stability, light weight, rapid deployment, strong anti-interference ability and low maintenance cost is provided, by using a set of signals with fixed and obvious characteristics generated by the call test system 100, connecting, through wired communication, test terminals with a device installed with the call test system 100, and running the test call test system 100 to perform signal processing, feature extraction, classification and recognition, etc. on the signal, so as to determine the call status.

Here, the terminal or device does not have to be a single electronic apparatus, and may also be an aggregation of any devices or circuits capable of performing the above processes alone or in combination. The terminal or device may also be a part of an integrated control circuit, or may be configured as a portable electronic apparatus interconnected with an interface locally or remotely (e.g., via wireless transmission).

The call test system 100 may include test scripts, programs, code fragments, etc., and may be stored in a computer-readable storage medium.

The above modules or units may be integrated into a smaller number of modules or units, or may be divided into a larger number of modules or units to achieve the same function. In addition, the above modules or units may include software components or hardware components, or a combination thereof. For example, each module and/or unit of embodiments may be implemented separately by one or more hardware processors and one or more memories. The one or more memories, in some embodiments, store instructions executed by the one or more hardware processors. Alternatively, all of the modules of call test system may be implemented altogether by the one or more hardware processors and the one or more memories. As yet another alternative, some modules and/or units may implemented by a first hardware processor and other modules and/or units may be implemented by a second hardware processor.

A computer-readable storage medium having stored computer program thereon may also be provided, wherein the computer program, when executed, implement the method according to the embodiment. Examples of the computer-readable storage medium herein include read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blue ray or optical disk memory, hard disk drive (HDD), solid state hard disk (SSD), card memory (such as multimedia card, secure digital (SD) card or extreme speed digital (XD) card), magnetic tape, floppy disk, magneto-optical data storage device, optical data storage device, hard disk, solid-state disk and any other device configured to store computer program and any associated data, data file and data structure in a non-transitory manner, and to provide the computer program and any associated data, data file and data structure to the processor or the computer so that the processor or the computer is capable of performing the computer program. The computer program in the computer-readable storage medium described above may run in an environment deployed in the computer apparatus such as a terminal, a client, a host, a proxy device, a server, etc. In addition, in one example, the computer program and any associated data, data file and data structures are distributed on a networked computer system, so that the computer programs and any associated data, data file and data structure are stored, accessed and executed in a distributed manner through one or more processors or computers.

After considering the description disclosed herein, those skilled in the art will easily conceive of other embodiments of the present disclosure. The present application aims to cover any variant, use or adaptive change of the present disclosure, which follows the general principles of the present disclosure and includes the common general knowledge or commonly used technical means in the technical art, which is not disclosed in the present disclosure. The description and embodiments are only regarded as exemplary, and the true scope and spirit of the present disclosure are pointed out by the claims.

It should be understood that the present disclosure is not limited to the precise structure already described above and shown in the drawings, and various modifications and changes may be made without departing from its scope. The scope of the present disclosure is limited only by the claims.

What is claimed is:

1. A system comprising:
    a signal generating module configured to generate a first calling signal in a first format;
    a testing module configured to:
        transmit a second calling signal in a second format converted from the first calling signal to a calling terminal,
        drive the calling terminal to transmit the second calling signal to a called terminal as a call event,
        receive a third called signal in the second format corresponding to the second calling signal from the called terminal, and
        convert the third called signal into a resultant called signal in the first format; and
    a signal processing module configured to compare the first calling signal with the resultant called signal to determine a call status between the calling terminal and the called terminal.

2. The system of claim 1, wherein the second calling signal is transmitted to the calling terminal through a first wired communication link and stored in a memory of the calling terminal,
    when the testing module drives the calling terminal to transmit the second calling signal to the called terminal, the second calling signal is read from the memory of the calling terminal and transmitted via wireless network, and
    when the second calling signal is received by the called terminal as the third called signal through the wireless network, the third called signal is transmitted to the testing module through a second wired communication link.

3. The system of claim 1, wherein the testing module comprises:
    a first format converting unit configured to convert the first calling signal into the second calling signal; and
    a second format converting unit configured to convert the third called signal into the resultant called signal.

4. The system of claim 1, wherein the signal processing module comprises:
    a feature extracting unit configured to extract first features of the first calling signal and second features of the third called signal; and
    an analyzing unit configured to:
        compare the first features and the second features, and determine the call status between the calling terminal and the called terminal based on a comparison result.

5. The system of claim 4, wherein the first features comprise a time domain envelope,
wherein the analyzing unit is configured to determine whether there are silent and intermittent abnormalities associated with the call event by comparing a first time domain envelope of the first calling signal and a second time domain envelope of the resultant called signal.

6. The system of claim 4, wherein the first features comprise a frequency domain line-spectrum,
wherein the analyzing unit is configured to determine whether there is noise associated with the call event by comparing a first frequency domain line-spectrum of the first calling signal and a second frequency domain line-spectrum of the resultant called signal.

7. The system of claim 1, wherein the signal generating module is configured to generate the first calling signal by:
selecting one frequency from each of a predetermined number of different frequency ranges as a fundamental frequency,
generating a predetermined number of signals corresponding to the respective selected fundamental frequencies, and
superimposing the predetermined number of signals.

8. The system of claim 7, wherein
the signal generating module is further configured to:
generate a plurality of calling signals in the first format,
allocate different signal identifiers to the plurality of calling signals, and
select one calling signal in the first format from among the plurality of calling signals as the first calling signal allocated to the calling terminal, wherein each calling signal of the plurality of calling signals has a different frequency domain line-spectrum and a same time domain envelope,
the testing module is further configured to:
transmit a signal identifier of the first calling signal to the calling terminal and the called terminal when transmitting the second calling signal to the calling terminal,
notify the calling terminal and the called terminal to set up the call event, and receive the signal identifier from the called terminal when receiving the third called signal, and
the signal processing module is further configured to:
determine the first calling signal among the plurality of calling signals based on the signal identifier, and
compare the first calling signal with the resultant called signal.

9. The system of claim 8, wherein other calling signals in the first format other than the first calling signal among the plurality of calling signals are used to determine other call status between respective other terminals.

10. The system of claim 1, wherein the first format is an analog format and the second format is a pulse code modulation (PCM) format.

11. A method comprising:
generating a first calling signal in a first format;
transmitting a second calling signal in a second format converted from the first calling signal to a calling terminal, wherein the second format is different from the first format;
driving the calling terminal to transmit the second calling signal to a called terminal as a call event;

receiving a third called signal in the second format corresponding to the second calling signal from the called terminal;
converting the third called signal into a resultant called signal in the first format; and
comparing the first calling signal with the resultant called signal to determine a call status between the calling terminal and the called terminal.

12. The method of claim 11, wherein the second calling signal is transmitted to the calling terminal through a first wired communication link and stored in a memory of the calling terminal,
wherein, when driving the calling terminal to transmit the second calling signal to the called terminal, the second calling signal is read from the memory of the calling terminal and transmitted via wireless network, and
wherein, when the third called signal corresponding to the second calling signal is received by the called terminal through the wireless network, the third called signal is transmitted from the called terminal through a second wired communication link.

13. The method of claim 11, wherein the comparing comprises:
extracting first features of the first calling signal and second features of the third called signal;
comparing the first features and the second features, and determining the call status between the calling terminal and the called terminal based on a comparison result.

14. The method of claim 13, wherein the first features comprise a time domain envelope, and the comparing further comprises determining whether there are silent and intermittent abnormalities associated with the call event by comparing a first time domain envelope of the first calling signal and a second time domain envelope of the resultant called signal.

15. The method of claim 13, wherein the first features comprise a frequency domain line-spectrum, and
the comparing further comprises determining whether there is noise associated with the call event by comparing a first frequency domain line-spectrum of the first calling signal and a second frequency domain line-spectrum of the resultant called signal.

16. The method of claim 11, wherein the generating of the first calling signal comprises:
generating the first calling signal by selecting one frequency from each of a predetermined number of different frequency ranges as a fundamental frequency,
generating a predetermined number of signals corresponding to the respective selected fundamental frequencies, and
superimposing the predetermined number of signals.

17. The method of claim 16, wherein
the generating of the first calling signal further comprises:
generating a plurality of calling signals in the first format,
allocating different signal identifiers to the plurality of calling signals, and
selecting one calling signal in the first format from among the plurality of calling signals as the first calling signal allocated to the calling terminal, wherein each calling signal of the plurality of calling signals has a different frequency domain line-spectrum and a same time domain envelope,
wherein a signal identifier of the first calling signal is transmitted to the calling terminal and the called terminal when the second calling signal is transmitted to the calling terminal, to notify the calling terminal and the called terminal to set up the call event, and the signal identifier is received from the called terminal when the third called signal is received, and wherein the comparing comprises:

determining the first calling signal among the plurality of calling signals, based on the signal identifier, and comparing the first calling signal with the resultant called signal.

18. The method of claim 17, wherein other calling signals in the first format other than the first calling signal among the plurality of calling signals are used to determine other call status between respective other terminals.

19. A computer-readable storage medium having stored computer program instructions thereon, the computer program instructions, when executed by a processor, causing the processor to implement the method of claim 11.

20. A system comprising at least one computing device and at least one storage device storing instructions, wherein the instructions, when executed by the at least one computing device, cause the at least one computing device to perform the method of claim 11.

* * * * *